United States Patent [19]  
Hassenboehler

[11] 3,807,224  
[45] Apr. 30, 1974

[54] UNIFORM PLANAR STRAIN TESTER
[75] Inventor: Charles B. Hassenboehler, Metairie, La.
[73] Assignee: The United States of America as represented by the Secretary of Agriculture, Washington, D.C.
[22] Filed: Apr. 6, 1973
[21] Appl. No.: 348,555

[52] U.S. Cl. .................................................. 73/95
[51] Int. Cl. ............................................. G01n 3/08
[58] Field of Search ................................. 73/95, 102

[56] References Cited
UNITED STATES PATENTS
3,580,050   5/1971   Waldron .......................... 73/102 X
3,422,669   1/1969   Craft .................................. 73/95 X Primary Examiner—Jerry W. Myracle

[57] ABSTRACT

This invention relates to an apparatus for stretching a textile material such that the magnitude of the strain at all points in the plane is equal in all directions in the plane of the specimen. The embodiment disclosed is an expandable circular pin frame. The pins mounted in pulleys are uniformly displaced radially outward and impart uniform radial strain without the edge effects associated with similar apparatuses employing nonexpanding fastening mechanisms.

1 Claim, 4 Drawing Figures

UNIFORM PLANAR STRAIN TESTER

A non-exclusive, irrevocable, royalty-free license in the invention herein described, throughout the world for all purposes of the United States Government, with the power to grant sublicenses for such purposes, is hereby granted to the Government of the United States of America.

This invention relates to an apparatus whereby a co-linear separation of two embodied plates can be caused to stretch a material to a constant magnitude of strain in all directions at all points in the plane of the material.

A problem of long standing in textile testing instruments is that of producing uniform biaxial strain in a specimen by a simple means. In measuring the elastic properties of textiles, tensile testers having jaws of fixed dimensions to clamp the specimen produce edge effects when the specimen is stretched. Heretofore, techniques for biaxial stretching require large and elaborate samples to eliminate edge effects. Simple apparatuses such as the Mullen diaphragm tester (Federal Test Method 191, Dec. 31, 1968; Method 5122) and the Celanese bagging tester (Thomas, Walter, Jr., Celanese Bagging Test for Knit Fabrics, Text. Chem. Color 3, 231–233 (1971), do not produce nor attempt to produce uniform ratio of planar strain over the test surface of the specimen. In the Mullen and Celanese tests, the perimeter of a circular specimen is held fixed by nonexpanding clamps while the interior of the specimen is deformed by an inflatable membrane or by a sphere pushed against the center of the specimen. The resultant strain, at any point in the specimen, is some function of the radial and angular orientation of the point in the plane of the specimen.

The apparatus of this invention permits a colinear separation of two embodied plates to strain a textile specimen such that the magnitude of the biaxial strain is equal in all planar directions at all points in the specimen.

It is an object of this invention to provide a means for stretching a material such that the magnitude of the strain at all points in the plane is equal in all directions in the plane of the specimen.

Another object of this invention is to provide a stretching apparatus, one embodiment of which includes an expandable circular pin frame "jaw," composed of rotatable pinned pulleys situated in the form of a torus, which imparts uniform planar strain at all points within the specimen test area, without the edge effects associated with similar apparatuses employing nonexpanding jaws.

A further object of this invention is to provide a testing instrument wherein the strain, at any point in the specimen, is uniform in any planar direction and for which the deformation, elastic recovery, and the force required to produce this said strain can be measured accurately.

Still another object of this invention is to simplify the means for measuring the load-deformation and recovery-strain response of low modulus textiles under a uniform planar strain.

A still further object of this invention is to stretch knitted fabrics such that yarn loop sliding is minimized in order that certain constituent yarn properties can be evaluated.

In particular, this invention relates to a uniform strain tester in which conventional fixed jaw edge effects and the tendency to neck while straining the textile specimen are eliminated.

More particularly, this invention relates to a strain tester, one embodiment of which produces biaxial strain at a ratio of unity, capable of producing strain in a textile specimen similar to the strain encountered in the skin covering the jointed parts of the human body during flexing motions.

It will be obvious to those skilled in the art that mechanisms for providing a continuous expandable jaw strain tester to eliminate edge effects can be accomplished by means other than the rotatable pinned pulleys of the embodiment disclosed.

Outwardly displacable pinned levers can be employed to stretch a specimen to certain unique states of planar strain.

The uniform strain tester, according to the instant invention, is described in detail below, reference being made to the accompanying drawings in which.

Figure 1A:
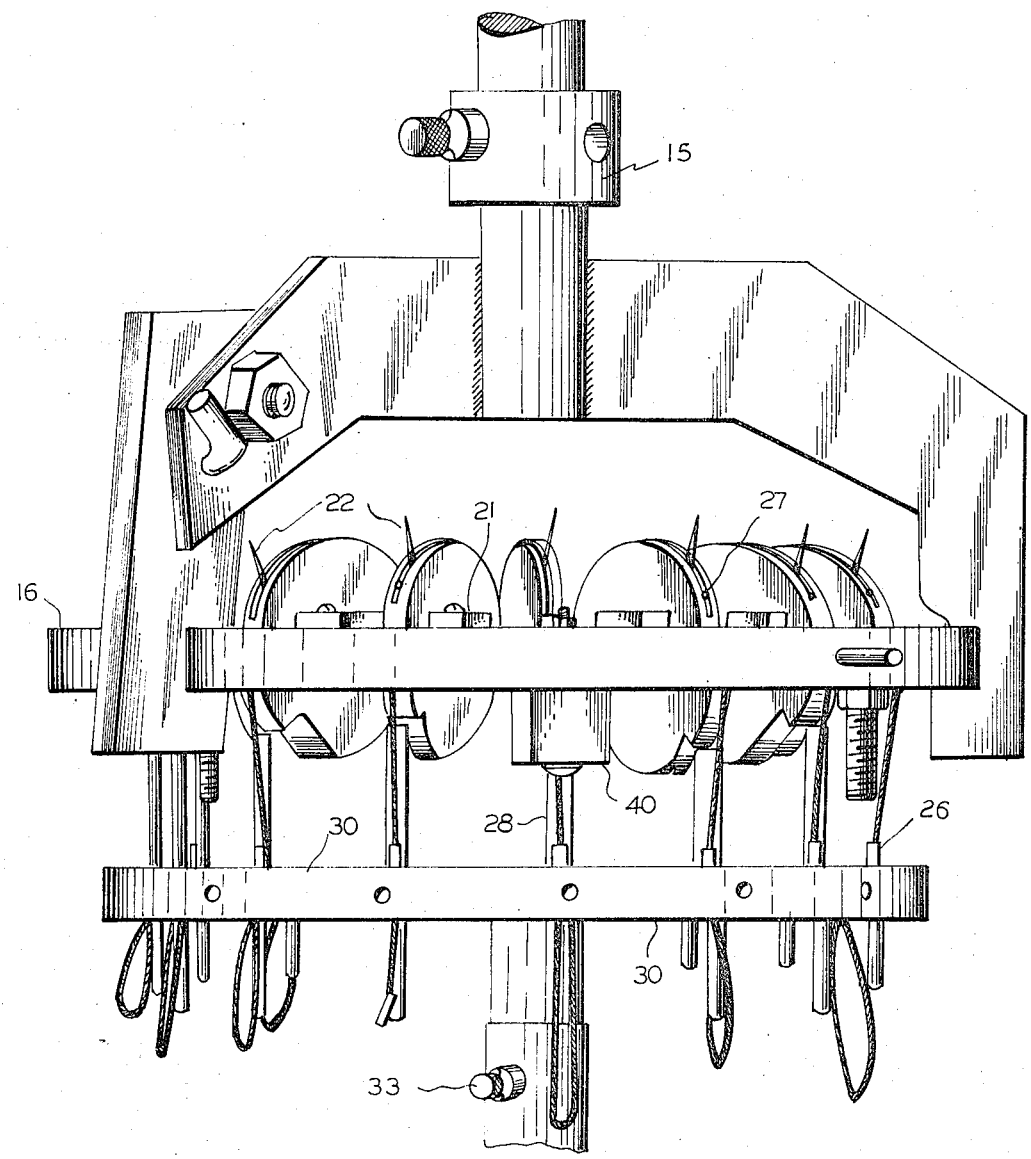
FIG. 1a represents a full view of the apparatus showing the outward movement of the pulley pins resulting from separating the upper and lower plates. No specimen is shown.
Figure 1B:
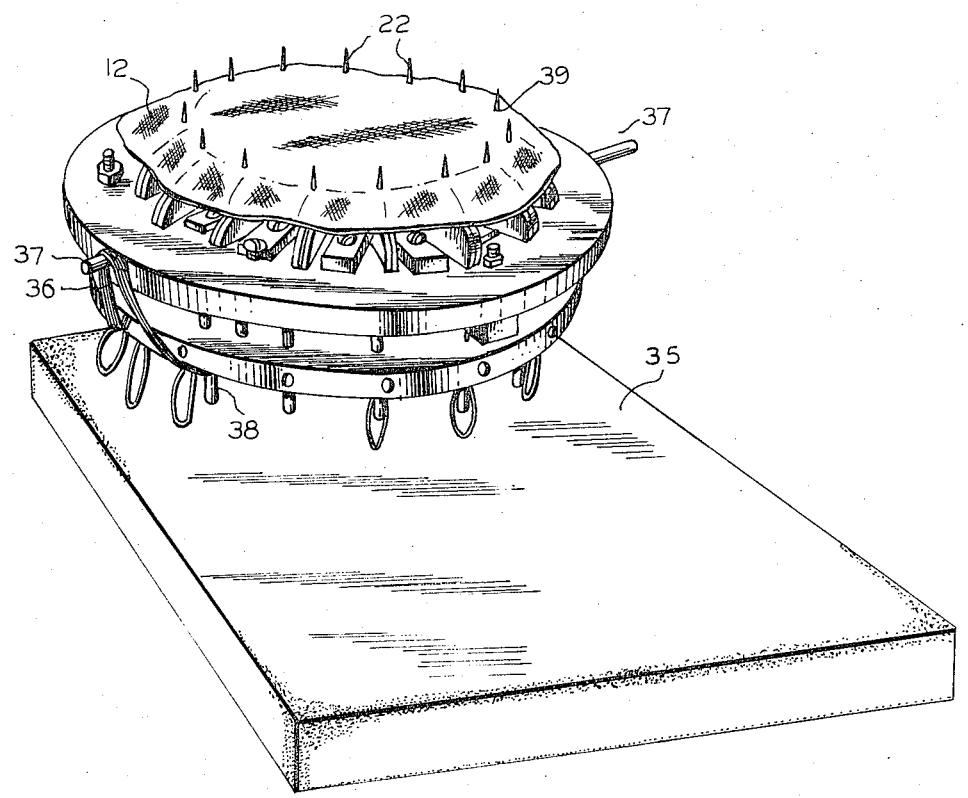
FIG. 1b represents a full view of the apparatus showing the specimen attached on the pinned pulleys.
Figure 2:
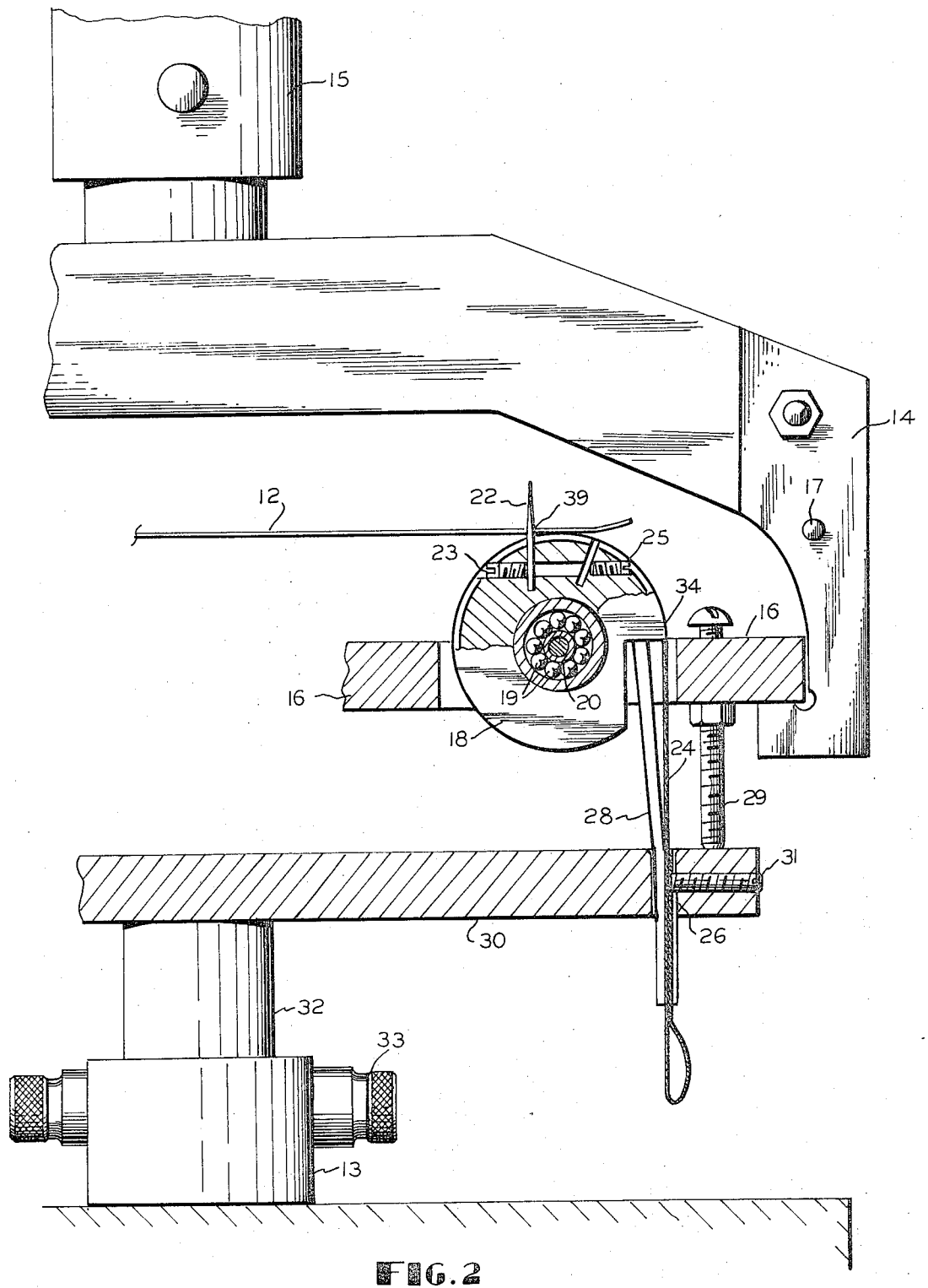
FIG. 2 represents a partial cross-sectional view of one angular unit of the apparatus showing the pulley and pushrod partially in full view and partially in cross-section.
Figure 3:
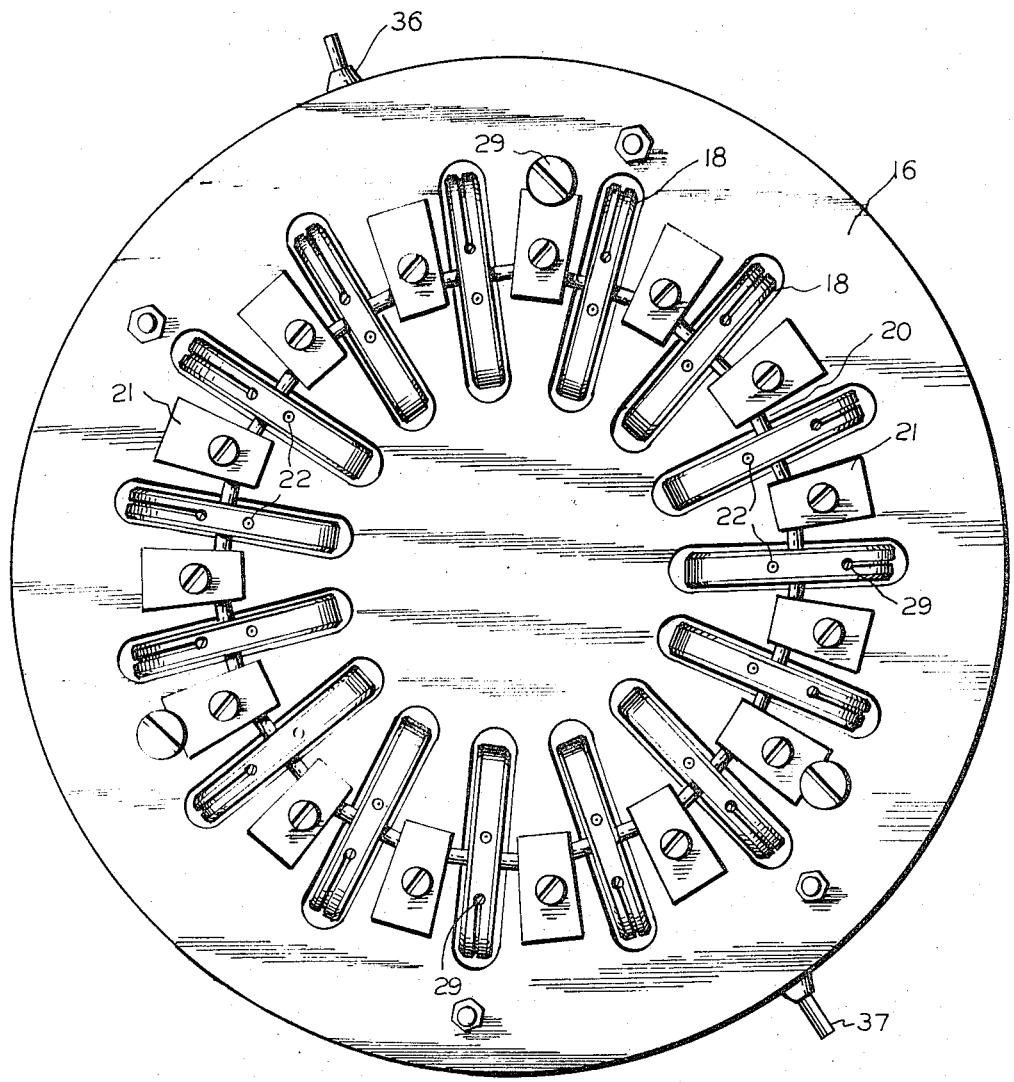
FIG. 3 represents a top view of the pulley plate.

Referring to FIG. 1b, uniform strain tester assembly with specimen 12 attached is installed in crosshead receiver 13, FIG. 1a and 2, of a conventional tensile testing machine not shown in which the crosshead is capable of up and down colinear movement.

Referring to FIG. 2, yoke 14, connected to the load cell coupling 15 of the tensile testing machine (not shown), supports the pulley plate 16 and is secured in place with latch pin 17.

Pulley plate 16 has pulleys 18 positioned equiangularly and equidistant from the center of the plate 16 and having the central plane of the pulleys 18 perpendicular to and containing a radius of the plate 16. Pulleys 18 revolve on pressed in thrust ball bearings 19 pressed into bearing shafts 20 that fit into kerfs not shown in plate 16 and held in place with bolted on plates 21. Needles 22 (holding specimen 12) are fastened to pulley 18 by set screws 23. Cables 24 are attached to pulleys 18 with set screws 25. Sleeves 26 are crimped on the cables 24 at a given cable length from the cable locating hole 27 in pulleys 18. Sleeves 26 lie within a V groove in push rods 28. Leveling screws 29 limit the initial or minimum spacing between the pulley plate 16 and cable plate 30 while adjusting pulley drive and indexing elements. In initial position, push rods 28 and cable 24 are adjusted so that needles are perpendicular to plate 16, and set with set screws 31. Flange 32 fits into crosshead receiver 13 and is held in place by ring 33.

The pushrods 28 are employed to return the pulleys 18 to their initial angular orientation as the plates are restored to their initial separation by the return motion of the crosshead 13. While approaching the initial position, the elasticity of the specimen is sufficient to return the pulley 18 to a position after which the curved in pushrod 28 contacts the pulley notch surface 34 ultimately establishing the initial orientation of the pulley 18. Curved in rods increase the range of specimen elasticity for which pushrods function. Pushrods and notches are designed so that the vertical separation between the pulley notch and the contacting pushrod end is directly proportional to the plate separation starting from the initial plate position as depicted in FIG. 2.

The cables 24 driving the pulleys 18 are of a material with high tensile stiffness to reduce cable stretching, and of very low bending modulus to reduce additive friction forces developed between pulley notches and pushrod ends. Cable stretching produces an apparent decrease in specimen modulus while frictional forces contribute to the biaxial forces causing an apparent increase in modulus. Bead chain is a suitable material for the cables.

Needles 22 are set toward center of plate 16 in order to increase the strain range for which the total specimen remains in one plane.

In operation, a circular specimen 12 (as in FIG. 1b) is mounted on the needles 22 by placing the specimen on a flat foamed polystyrene board 35, sticking the exposed pins of the device through the relaxed specimen and into the board, then removing the board. Rubber bands 36 are fastened around pins 37 and pushrod extensions 38 to hold plates together only during specimen mounting procedures.

Referring to FIG. 2, assembly is then mounted onto the crosshead flange 13 of the conventional tensile testing machine. Tripod 14 is fitted over plate 16 and secured in place by pin 17, then connected to load cell coupling 15. As crosshead separates from load cell coupling 15 by a small distance s, cable plate 30 moves each pulley-needle intersection point 39 an arc length distance s away from the midpoint of the specimen while the specimen remains on the perimeter of the rotated pulley. Points 39 on the perimeter of the specimen are displaced a distance s away from the specimen midpoint given by the magnitude of the crosshead displacement.

Force to displace each point 39 is transmitted directly to cable plate along with the additional frictional constraint of the ball bearings 19, and the summation of all such forces from all pulleys is transmitted to the load cell coupling 15.

At impending separation from the initial position, FIG. 2, pushrods 28 are in weak contact with pulley notch surfaces 34. Upon increased separation of plates, the distance between pushrod ends and the point of closest approach on pulley notch surface 34 increases proportionately, thus, creating no additional frictional constraints added to the forces transmitted to the load cell. After the crosshead is reversed, the plates return to the initial position and the elasticity of the specimen suffices to restore the pulley to a position from which the returning pushrods 28 engage on the pulley notch surfaces 34 and drive the pulleys to their initial positions. Pushrod guide blocks 40 prevent blockage of the pushrods 28 at the pulley plate 16 surface. An advantage in this apparatus is that small simple-shaped samples can be used in biaxial straining tests because common nonexpanding jaw-edge effects are eliminated.

The locus of specimen holding points 39, approximating a continuous circular jaw, expands in perimeter as each point 39 is displaced a specific amount radially away from the center of the specimen thus producing, in effect, an expandable circular jaw or clamp. A larger number of points 39 will more closely approximate a continuous clamp, thus eliminating all edge effects. The strain between any two points 39 is equal, thus the strain at any point in the circle is uniform in magnitude in all directions in the plane of the specimen.

Although the apparatus is described using long pushrods and cables to define the orientation of the pinned pulleys, the successful performance of the invention is not so limited. Other means for indexing the pulleys may be incorporated such as having a chordal flat on each pulley in the semicircle opposite the pulley needle, the end of which flat contacts a surface fixed to the cable plate and common to the flat on each pulley and rotatably positions the pulley in the sample mounting position, as the cable plate and pulley plates are displaced toward each other. Cables have equal slack at this minimum separation.

For some purposes, the results of stretching textiles biaxially at fixed strain ratios other than unity, as described in the embodiment disclosed herein, are desired. Parts of the apparatus of the embodiment disclosed can be arranged in a specific manner to produce any state of strain in the surface of the specimen along with the other advantages attributable to the disclosed embodiment. The pulleys can be arranged on an ellipse in order to produce a specific, uniform state of strain in the surface of the specimen, that is, having a specific strain ratio as well as uniform magnitudes of directional strain at all points within the specimen for any plate separation. In order to construct an apparatus to produce a mode of strain having a strain ratio of $a/b$ or $b/a$ pulley midpoints are placed at cartesian coordinate points $(x_i, y_i)$ on the ellipse given by:

$$x^2/A + y^2/B - 1 = 0$$

inscribed in the plane of a pulley plate.

$A = C \cdot a$ and $B = C \cdot b$ are the magnitudes of the principal axes of the ellipse. The central plane of the pulleys are orientated perpendicular to the plate and at angles $\theta_i$ with respect to the $x$ axis where $\theta_i$ is the angle associated with the cartesian coordinates of the point $x_i$, $y_i$ through the parametric equations of the ellipse, namely $x_i = A \cos \theta_i$ and $y_i = B \sin \theta_i$. Note that the apparatus of the invention disclosed is a special case of the general elliptic case in which the strain ratio is unity.

I claim:

1. A device for imparting a uniform state of strain to a textile comprising in combination:
a first generally disk-shaped plate carrying a plurality or pulleys, each pulley having a single peripheral pin, a second generally disk-shaped plate, means associated with said second plate to provide controlled movement of the pulleys of said first plate, and means for aligning and adjustably supporting said first plate, said second plate, and the said pulleys, said supporting means adapted for attachment to external means in the form of a tensile-testing machine for separating said plates, said first generally disk-shaped plate, carrying a plurality of rotatable, radially mounted, generally disk-shaped pulleys each uniformly spaced relative its adjacent counterpart pulleys, perpendicular to plane of first said plate, each pulley, when oriented in the sample loading position, holding a needle mounted in and extending out of the central plane of the pulley on a line parallel to and inwardly disposed from a radius of the pulley toward the center of and perpendicular to said first plate, with the extending point of said needle directed normal away from plane of said first plate, driving means for each pulley comprising a cable, one end of which is attached to said pulley at a point immediately adjacent and outboard the base of said needle, said cable lying in a groove in the periphery of said pulley, said cable proceeding from said first plate to said second generally disk-shaped plate and adjustably secured thereto, said second plate oriented parallel to said first plate, said second plate having a plurality of holes equal in number to number of cables, each aligned with a cable, support means for said second plate adapted to attach to external means in the form of the cross-head of a tensile-testing machine, and indexing means associated with each pulley, said indexing means adapted to rotationally position said pulley uniformly relative its adjacent counterpart pulleys in the sample loading position.

* * * * *